(12) United States Patent
Blum et al.

(10) Patent No.: US 6,451,856 B1
(45) Date of Patent: *Sep. 17, 2002

(54) CARNITINE SUPPLEMENTED DIETS FOR GESTATING AND LACTATING SWINE

(75) Inventors: Stephen A. Blum, Marion, TX (US); Kevin Q. Owen, Manhattan, KS (US); Jim L. Nelssen, Manhattan, KS (US); Robert D. Goodband, Manhattan, KS (US); Michael D. Tokach, Abilene, KS (US); Rene A. Blum, Quellenstrasse (CH); Robert E. Musser, Manhattan, KS (US)

(73) Assignees: Lonza Inc., Annandale, NJ (US); Kansas State University Research Foundation, Manhattan, KS (US)

( * ) Notice: Subject to any disclaimer, the term of this patent is extended or adjusted under 35 U.S.C. 154(b) by 3 days.

This patent is subject to a terminal disclaimer.

(21) Appl. No.: 09/618,703

(22) Filed: Jul. 18, 2000

(Under 37 CFR 1.47)

Related U.S. Application Data

(63) Continuation of application No. 08/984,080, filed on Dec. 3, 1997, now Pat. No. 6,242,487, which is a continuation-in-part of application No. 08/844,918, filed on Apr. 22, 1997, now abandoned, which is a continuation of application No. 08/759,765, filed on Dec. 3, 1996, now abandoned.

(51) Int. Cl.$^7$ .............................................. A61K 31/195
(52) U.S. Cl. ......................................................... 514/561
(58) Field of Search ......................................... 514/561

(56) References Cited

U.S. PATENT DOCUMENTS 6,242,487 B1 * 6/2001 Blum et al.

* cited by examiner

Primary Examiner—Theodore J. Criares
Assistant Examiner—Jennifer Kim
(74) Attorney, Agent, or Firm—Darby & Darby

(57) ABSTRACT

The present invention relates to a method of feeding carnitine supplemented diets to sows during the period of gestation or during both gestation and lactation periods. The method enhances pork productivity by increasing litter and pig birth and weaning weights, reducing the number of stillborn pigs and increasing the number of pigs born alive in the subsequent reproductive cycle. Sow diets of this invention include carnitine, such as L-carnitine or L-carnitine salts. Carnitine is generally added to the swine feed formulation in the amount of from about 5 to about 5,000 ppm.

22 Claims, No Drawings

CARNITINE SUPPLEMENTED DIETS FOR GESTATING AND LACTATING SWINE

This application is a continuation of Ser. No. 08/984,080 filed Dec. 3, 1997 now U.S. Pat. No. 6,242,487 which is continuation in part application of U.S. application Ser. No. 08/844,918 filed Apr. 22, 1997, which is a continuation of U.S. application Ser. No. 08/759,765 filed Dec. 3, 1996 Both Aband. Both applications are hereby incorporated by reference in their entirety.

FIELD OF THE INVENTION

The present invention is in the general field of swine farming and relates to feeding carnitine-supplemented diets to swine during the period of gestation or during the periods of both gestation and lactation to increase pork productivity by, for example, increasing litter and pig weights at birth and at the time of weaning and by increasing the number of pigs born alive in the subsequent reproductive cycle (i.e., the cycle following the cycle of carnitine supplementation). Swine diets of this invention include carnitine, such as L-carnitine or L-carnitine salts, present in the amount effective to increase the litter and pig birth and weaning weights.

BACKGROUND OF THE INVENTION

Carnitine is a naturally occurring B vitamin-like compound found in humans and other mammals. Carnitine has many functions, but its primarily role is in the transport of fatty acids into the mitochondria. Previous research (U.S. Pat. Nos. 5,124,357 and 5,192,804) has shown that carnitine supplementation of diets increases the lean to fat ratio of pigs. Its beneficial effects of increasing carcass leanness and improving the lean to fat ratio were also shown in fish (U.S. Pat. No. 5,030,657). In addition, carnitine has been shown to improve the hatchability of eggs when fed to laying hens (U.S. Pat. No. 5,362,753).

Carnitine is synthesized in the body from two essential amino acids, protein bound lysine and methionine. The level of enzyme involved in the synthesis of carnitine is extremely low in newborn piglets (Coffey et al., Carnitine Status and Lipid Utilization in Neonatal Piglets Fed Diets Low in Carnitine, J. Nutr. 121:1047–53; 1991). The newborn piglet must quickly switch from carbohydrate transplacental nourishment to a high-fat milk based diet. Thus, during the suckling period, the neonate must quickly develop the capacity to oxidize fatty acids and ketone bodies as fuel alternatives to carbohydrates. Given the role of carnitine in the fatty acid metabolism, its availability to newborns in adequate amounts is essential (Borum, P. R., Variation in Tissue Carnitine Concentration with Age and Sex in the Rat, Biochem J. 176:677; 1978).

The primary source of carnitine in neonatal tissue, at least 2–3 days post partum, is milk (Robles-Valdez et al., Maternal Fetal Carnitine Relationships and Neonatal Ketosis in the Rat, J. Biol. Chem. 251:6007; 1976). The presence of carnitine in the milk should enhance the piglets' ability to utilize milk fat. Coffey et al. compared lipid utilization by pigs nursing from their sow with lipid utilization by pigs fed a milk replacer with or without added carnitine and found that nursing pigs were heavier than pigs fed milk replacer. However, pigs fed the milk replacer with added carnitine grew faster (day 7 to 21) than those fed the milk replacer without carnitine. Carnitine supplementation did not affect lipid or glucose status of the pig.

Other researchers have described the effect of supplemented carnitine on milk production and fatty acid metabolism. Erfle et al. (Effect of Infusion of Carnitine and Glucose on Blood Glucose, Ketones, and Free fatty Acids of Ketotic Cows, J. Dairy Sci. 54:673–80; 1971) infused carnitine into ketotic lactating dairy cows and found improved fatty acid oxidation.

As noted above, the availability of carnitine in the diet of newborn pigs is essential for efficient transition to a high-fat milk diet. However, methods for supplementing the milk diet of nursing pigs with carnitine are presently unavailable. Use of milk replacer containing carnitine as suggested for cows would not be practicable on a large commercial scale. More importantly, milk replacers do not contain all other essential components of the swine milk. There is therefore a need in the art for alternative ways for improving the performance of newborn pigs and particularly for increasing pig and litter birth and weaning weights.

Previous research has suggested that feeding L-carnitine supplemented diets to sows during the last 10 days of gestation and continuing during the entire period of lactation has certain beneficial effects on litter performance. Fremaut, D. et al., Do Lactating Sows Benefit from L-Carnitine Supplementation, Varkensbedrijf, Jun. 20–23, 1993.

Applicants have now surprisingly discovered that feeding sows a diet containing L-carnitine only during the period of gestation substantially increases litter and pig performance both at birth and at weaning. The litter and pig performance was also improved when sow diets were supplemented with carnitine during both gestation and lactation periods. However, feeding carnitine to sows substantially only during lactation was not found particularly beneficial.

SUMMARY OF THE INVENTION

The present invention relates to feeding carnitine-supplemented diets to swine during the period of gestation only, or during both gestation and lactation, to increase litter and pig performance and increase pork productivity.

Accordingly, one aspect of the present invention is a method of feeding carnitine-supplemented diets to sows during the period of gestation to increase litter and pig performance at birth and/or at weaning.

Another aspect of the present invention is a method of feeding carnitine-supplemented diets to sows during the periods of both gestation and lactation to increase litter and pig performance at birth and/or at weaning.

Yet another aspect of the present invention is a method of feeding carnitine-supplemented diets to sows during the period of gestation only or during both gestation and lactation to reduce the number of stillborn pigs.

Still another aspect of the present invention is a method of increasing pork productivity by increasing the number of pigs born alive in the subsequent, second reproductive cycle by supplementing a swine diet with carnitine in the first reproductive cycle during gestation only or during both gestation and lactation.

Still another aspect of the present invention is a method of increasing pork productivity by supplementing a swine diet with carnitine and feeding the supplemented diet to swine during gestation only or during both gestation and lactation.

DETAILED DESCRIPTION OF THE INVENTION

All patents, patent applications and literature references cited in this specification are hereby incorporated by reference in their entirety.

The present invention relates to feeding carnitine-supplemented diets to swine during the period of gestation only, or during both gestation and lactation, to improve litter and pig performance. Generally, feeding L-carnitine supplemented diets to sows improves pig and litter weights at birth and/or weaning and increases the number of pigs born alive in the subsequent reproductive cycle. The invention also relates to increasing pork productivity by supplementing a swine diet with carnitine and feeding the supplemented diet to swine during gestation only or during both gestation and lactation.

In the practice of this invention, the female swine diet can be supplemented with carnitine from approximately mating. Carnitine can be fed throughout the period of gestation (i.e., from approximately mating to approximately parturition) or for a portion thereof. Carnitine can also be fed from mating and throughout the period of lactation (i.e., from approximately parturition until offspring is weaned or lactation is terminated by decision of the herdsperson) or for a portion of lactation period. Most preferably, for the efficient use of carnitine, carnitine is supplemented throughout the period of gestation or a portion thereof, i.e., not during lactation.

L-carnitine supplemented diets can be fed according to the present invention for a portion of the gestation or lactation period. In one preferred embodiment, the diet is fed five days after breeding until farrowing, i.e., 109 days out of 114 days of gestation. The diet can also be fed for a shorter period during gestation, for example for at least 5 days, and preferably for at least 10 days, during the first 90 days of gestation. In another preferred embodiment, carnitine is supplemented for at least 5 days, and preferably for at least 10 days, during the first 60 days of gestation.

To increase litter performance at birth and/or weaning, the diet is fed during gestation only or during both lactation and gestation. It has been found that feeding sows L-carnitine supplemented diets during the period of lactation only does not significantly improve litter performance in comparison to the control.

The feed formulation of the invention comprises carnitine. The supplemental carnitine can be any isomer of carnitine, preferably L-carnitine. Also suitable for formulation of the diet of the present invention are salts of carnitine, such as acetyl carnitine, and di-carnitine-tartrate. These materials may be encapsulated or protected.

The carnitine is present in the feed formulation of the invention in an amount effective to achieve the desired improvement of litter and pig performance, such as an increase in pig and litter birth or weaning weights or a reduction of the number of stillborn pigs or an increase in number of pigs born alive in the subsequent reproductive cycle. This improvement can be of any level above the litter and pig performance of swine fed a diet without carnitine, as even the small differences in birth or weaning weights have significant effect on meat productivity. For example, the methods of the present invention decrease fixed investment costs and production costs since the period from the pig birth to the meat market is shorter then when swine are fed conventional diets.

Generally, the feed formulation for use in the invention contains from about 5 to about 5,000 ppm of carnitine, preferably from about 5 to about 200 ppm. Given the detailed guidance of the present specification, it is believed that it is within the level of one of ordinary skill to test a range of carnitine concentrations using a trial feed in order to optimize the concentration for the particular breed and stage of development being fed. Generally, a gestating swine is fed from approximately 9 to approximately 14,000 mg carnitine per day, more preferably from approximately 9 to approximately 550 mg carnitine per day. A lactating swine is fed from approximately 20 to approximately 34,000 mg carnitine per day, more preferably from approximately 20 to approximately 1,400 mg carnitine per day.

The base diet of the present invention can be any typical swine diet known in the art, including those specially formulated for gestating or lactating swine. For example, a typical diet will include a selection of the ingredients described below. Extensive guidance in formulating diets for the feeding of swine can be found in "Nutrient Requirements of Swine", Nutrient Requirements of Domestic Animals, Number 3, 9th rev. ed. (National Academy of Science, Washington, D.C. (1988)).

In the United States, most swine are fed a diet consisting of about 97% milo or corn in combination with soybean, the remaining 3% consisting of carriers combined with one or more inorganic elements, vitamins, or antimicrobial compounds. For example, a standard diet may contain 79.5% corn; 17.4% soybean meal; 0.9% defluorinated phosphate; 0.65% limestone meal (35% Ca); 0.25% sodium chloride; 0.25% vitamin premix; 0.25% trace element premix; and 0.25% antimicrobial premix. Oats, sorghum and synthetic amino acids are sometimes added. In Europe, corn and soybean meal are generally not as available nor as cost effective as beans, peas, barley, wheat, rape seed meal, cassava (tapioca), molasses, fish, bone, and meat meal. These are acceptable although not preferred amino acid sources.

In formulating the diets for gestating or lactating swine, a person of skill in the art can use the general knowledge in the art. For example, the Nutrient Requirements of Swine can be consulted to determine the amino acids, mineral elements, vitamins, and other dietary requirements for swine as a function of weight. The diet can contain between 5 and 30% by weight crude protein and be formulated for the specific use as a gestation or a lactation diet. For example, a gestating swine diet may contain from about 100 to about 400 g/hd/day of crude protein, from about 7 to about 14 g/hd/day of lysine, from about 12 to about 18 g/hd/day of calcium and from about 10 to about 16 g/hd/day of phosphorus. An exemplary lactating swine diet may contain 600 to about 1800 g/hd/day of crude protein, from about 30 to about 70 g/hd/day of lysine, from about 35 to about 55 g/hd/day of calcium and from about 30 to about 50 g/hd/day of phosphorus.

A further example of recommended daily nutrient levels during gestation and lactation expressed in grams per head per day (g/hd/day), except where noted otherwise, is shown in Table 1.

TABLE 1

| COMPONENT | GESTATION | LACTATION |
|---|---|---|
| Crude Protein | 250 | 899 |
| Lysine | 11 | 44 |
| Tryptophan | 2.5 | 11 |
| Threonine | 8 | 32 |
| Minerals | | |
| Calcium | 16 | 48 |
| Phosphorus | 14.5 | 43 |
| Salt | 9 | 27 |
| Copper, mg | 30 | 90 |
| Iodine, mg | .54 | 1.6 |
| Iron, mg | 300 | 900 |
| Manganese, mg | 72 | 216 |

TABLE 1-continued

| COMPONENT | GESTATION | LACTATION |
|---|---|---|
| Selenium, mg | .18[a] | .54[b] |
| Zinc, mg | 300 | 900 |
| Vitamins | | |
| Vitamin A, IU | 20,000 | 60,000 |
| Vitamin D, IU | 3,000 | 9,000 |
| Vitamin E, IU | 80 | 240 |
| Vitamin K,[c] mg | 8 | 24 |
| Riboflavin, mg | 15 | 45 |
| Niacin, mg | 90 | 270 |
| d-Pantothenic Acid, mg | 52 | 156 |
| Vitamin $B_{12}$, mg | .06 | .18 |
| Folic Acid, mg | 3 | 9 |
| Biotin, mg | .4 | 1.2 |
| Choline, mg | 1,000 | 3,000 |

[a]legal addition if fed 4 lb/hd/day
[b]assumes at least 12 lb/day feed intake of a diet containing .80% lysine
[c]menadione sodium bisulfite (MSB) or equivalent As shown in Table 1, feed formulations for gestating swine are different from feed formulations for lactating swine. Generally, a requirement for protein, lysine, tryptophan and threonine is from about 3.5 to about 4 times higher for lactating swine.

Other feed components necessary for both types of feeds may be, for example, in the following ranges expressed in pounds of a component per 2000 pounds of feed:

TABLE 2

| COMPONENT | GESTATION FEED | LACTATION FEED |
|---|---|---|
| Milo or Corn, lb | 1,533–1,684 | 1,359–1,568 |
| Soybean Meal, lb (46.5%) | 235–379 | 343–557 |
| Monocalcium Phosphate, lb | 37–46 | 41–45 |
| Limestone, lb | 20 | 19–20 |
| Salt, lb | 10 | 10 |
| Sow Add Pack, lb | 5 | 5 |
| Vitamin Premix, lb | 5 | 5 |
| Trace Mineral Premix, lb | 3 | 3 |
| Selenium Premix, lb | 1 | 1 |

Suitable swine to be fed the diet of the present invention include but are not limited to all standard breeds of swine such as large white breeds and swine derived from specific breeding companies (PIC, Newsham, Dekalb and others).

The feed schedule and feed rates used with the present method can be any standard schedule and rate used in the art. Generally, gestating swine are fed from about 4 to about 6 pounds of the diet per day, and preferably from about 4 to about 5 pounds per day. Lactating swine are generally fed from about 9 to about 15 pounds of the diet per day, and preferably from about 13 to about 14 pounds per day. Generally, the feed is administered from 1 to 2 times a day for gestating swine and from 1 to 2 and up to 4 times a day for lactating swine.

The following non-limiting example is representative of the present invention.

EXAMPLE 1
Effect of L-carnitine Fed During Gestation, Lactation or Both on Sow and Litter Performance A total of 307 sows (PIC Line C-15x326) were used to determine the effect of feeding 50 ppm L-carnitine on the sow and litter performance. Sows were randomly assigned to either control or test dietary treatments. The three test treatments were designated as follows: (i) control/carnitine (in which carnitine was supplemented only during the period of lactation); (ii) carnitine/control (in which carnitine was supplemented only during the period of gestation) and (iii) carnitine/carnitine (in which carnitine was supplemented during the periods of both gestation and lactation).

A gestation diet was formulated to contain nutrients in excess of NRC (1988) estimates, and included 79.51% milo; 15.22% soybean meal (46.5% CP); 2.51% monocalcium phosphate; 1.11% limestone; 0.5% sodium chloride; 0.25% sow premix; 0.25% vitamin premix; and 0.15% trace element premix. This diet contained 0.65% total lysine, 0.95% Ca and 0.85% P. Experimental gestation diet contained 50 ppm L-carnitine. Sows were fed 4 lb of diet/day once a day until farrowing. Sows were weighed and last rib fat debt was recorded at day 110 of gestation. At farrowing, a number of pigs born live, stillborn, and mummies were recorded. Individual pig weight and litter weight were also recorded. Within 48 hours from farrowing, litters were equalized within dietary treatment.

A lactation diet was formulated to contain nutrients in excess of NRC (1988) estimates, and included 62.91% milo; 28.41% soybean meal (46.5% CP); 4% soybean oil; 2.33% monocalcium phosphate; 1.12% limestone; 0.5% sodium chloride; 0.25% sow premix; 0.25% vitamin premix; 0.15% trace element premix; 0.05% vitamin E and 0.02% DL-Methionine. This diet contained 1.0% total lysine, 0.95% Ca and 0.85% P. Experimental lactation diet contained 50 ppm L-carnitine. The sows were allowed ad libitum access to feed. Feed intake was measured weekly. Pigs were weighed at weaning to determine pig and litter weight. Sows were ultrasonically scanned for last rib fat debt at weaning.

Sows were bled at day 10, 60, 90 and 110 of gestation and at weaning. Plasma samples were analyzed for concentration of free and total carnitine, insulin, and insulin-like growth factor I (IGF-I).

The data were analyzed by analysis of variance using GLM procedure of SAS (1988).

The results are represented in Table 3.

Feeding L-carnitine supplemented diets only during gestation increased both pig ($P<0.01$) and litter ($P<0.03$) birth weights. It also increased pig ($P<0.01$) and litter ($P<0.07$) weight at weaning, and pig ($P<0.03$) and litter ($P<0.12$) weight gain.

The results also showed that the number of stillborn pigs per litter decreased when sows were fed carnitine-supplemented diets during gestation only (0.49 vs 0.76 stillborn pigs/litter; $P<0.02$).

With respect to sow performance, feeding L-carnitine during gestation only resulted in heavier sows at weaning compared to control sows (511 lb vs. 493; $P<0.01$).

Feeding carnitine during both gestation and lactation also had beneficial effects. For example, sow weight at weaning was 524 lb for sows feed carnitine during birth periods and 493 lb for control sows. However, referring to Table 3, no differences were observed in either sow or litter performance as a result of feeding carnitine during the period of lactation only.

With respect to sow plasma analysis, L-carnitine supplementation tended to increase insulin levels in the plasma of sows at days 10 and 60 of gestation ($P<0.07$), and IGF-I concentration tended to increase at gestation days 60 and 90. Since insulin and IGF-I may increase secondary muscle fiber in the fetal pig and IGF-I may play a role in myogenic differentiation and proliferation, these results suggest that feeding carnitine can have an overall beneficial effect on pork productivity.

The effect of carnitine on subsequent reproductive performance was also measured. Sows fed diets described above were continued to be monitored during the subsequent, i.e., second cycle of reproduction. The sow diets were not supplemented with carnitine during the second cycle of reproduction to determine if carnitine had any residual effect. The total number of pigs born and the number of pigs born alive were determined. Referring to Table 5, feeding carnitine in the first reproductive cycle increased the total number of born pigs and the number of pigs born alive in the second reproductive cycle.

TABLE 3

| | Dietary Treatment | | | | | Probability (P<) | | |
|---|---|---|---|---|---|---|---|---|
| Gestation Item Lactation: | Control Control | Control Carnitine | Carnitine Control | Carnitine Carnitine | SEM | Gest. | Lact. | Gest. × Lact. |
| No. sows | 75 | 75 | 86 | 58 | | | | |
| Parity | 3.72 | 3.82 | 3.64 | 3.77 | .13 | .63 | .43 | .92 |
| Lactation length, days | 15.7 | 15.9 | 15.3 | 15.7 | .16 | .15 | .30 | .62 |
| Pigs equalized by day 2 | 9.98 | 10.09 | 10.20 | 10.01 | .32 | .85 | .91 | .67 |
| Litter birth weight, lb | 31.50 | 32.73 | 34.46 | 34.49 | .98 | .03 | .55 | .57 |
| Pig birth weight, lb | 3.22 | 3.32 | 3.45 | 3.53 | .06 | .01 | .17 | .81 |
| Pigs weaned per litter[a] | 8.91 | 8.89 | 9.02 | 9.00 | .31 | .76 | .96 | .99 |
| Survivability, % | 89.57 | 86.08 | 86.87 | 90.45 | 1.84 | .69 | .98 | .10 |
| Litter weight at weaning, lb | 90.71 | 91.91 | 97.69 | 99.03 | 3.41 | .07 | .75 | .99 |
| Pig wean weight, lb | 10.33 | 10.38 | 10.94 | 10.99 | .18 | .01 | .79 | .99 |
| Litter weight gain, lb | 58.69 | 58.59 | 62.83 | 64.25 | 2.71 | .12 | .84 | .81 |
| Pig weight gain, lb | 7.08 | 7.11 | 7.52 | 7.45 | .15 | .03 | .91 | .76 |
| Average daily feed intake, lb | | | | | | | | |
| wk 1 | 11.70 | 11.55 | 11.52 | 11.88 | .19 | .73 | .64 | .28 |
| wk 2 | 14.35 | 14.41 | 14.70 | 14.87 | .21 | .11 | .64 | .28 |
| overall | 13.22 | 13.01 | 13.16 | 13.58 | .17 | .20 | .63 | .12 |

[a]Analyzed with pigs per litter on day 2 as the covariate.

TABLE 4

Effects of L-Carnitine on Subsequent Reproductive Performance

| | Dietary Treatment | | | | | Probability (P<) | | |
|---|---|---|---|---|---|---|---|---|
| Gestation: Item Lactation: | Control Control | Control Carnitine | Carnitine Control | Carnitine Carnitine | SEM | Gest. | Lact. | Gest. × Lact. |
| No. sows | 47 | 44 | 55 | 37 | | | | |
| No. sows removed[a] | 28 | 31 | 31 | 21 | | | | |
| Days to estrus | 5.28 | 5.82 | 6.11 | 5.37 | .38 | .64 | .80 | .12 |
| Farrowing rate, % | 96.1 | 96.3 | 86.5 | 93.2 | .05 | .22 | .51 | .54 |
| Number total born | 11.24 | 12.26 | 11.97 | 12.85 | .40 | .21 | .09 | .90 |
| Number born live | 10.15 | 11.22 | 11.17 | 12.03 | 3.46 | .04 | .05 | .83 |

[a]Sows were removed for injury, no estrus by day 35, or age.

In conclusion, the results establish that feeding carnitine supplemented diets to sows during the gestation period only has the most beneficial effect on increasing pork productivity primarily by increasing litter and pig birth weights, and litter and pig wean weights. Some beneficial results were observed when carnitine was fed during both gestation and lactation periods. However, feeding carnitine during the lactation period only was least beneficial.

Having described this invention and its benefits in detail above, it will be apparent that a skilled practitioner can make modifications and changes of the invention without departing from the scope or spirit of the claims which follow.

What is claimed is:

1. A method for supplementing sow diets with L-carnitine comprising feeding a diet formulation comprising about 5 to 5000 ppm of L-carnitine or a salt thereof to a sow at least during five days in the first ninety days of gestation.

2. The method of claim 1, wherein from 5 to 200 ppm of the L-carnitine is present in the diet formulation.

3. The method of claim 1, wherein said L-carnitine is fed for at least ten days in the first ninety days of gestation.

4. The method of claim 1, wherein said L-carnitine is fed for at least five days in the first sixty days of gestation.

5. The method of claim 1, wherein said L-carnitine is fed for at least ten days in the first sixty days of gestation.

6. The method of claim 1, wherein the diet formulation further comprises from about 12% to about 30% by weight of crude protein.

7. The method of claim 1, wherein said diet formulation is also fed to the sow throughout all or part of the lactation period.

8. The method of claim 1, wherein the diet formulation comprises about 50 ppm of L-carnitine.

9. A method for supplementing sow diets with L-carnitine comprising; feeding a diet formulation comprising from about 6 to about 5,000 ppm L-carnitine or a salt thereof to a sow at least throughout the gestation period.

10. The method of claim 9, wherein from 5 to 200 ppm of the L-carnitine is present in the diet formulation.

11. The method of claim 9, wherein the diet formulation further comprises from about 12% to about 30% by weight of crude protein.

12. The method of claim 9, wherein said diet formulation is also fed to the sow throughout all or part of the lactation period.

13. The method of claim 9 wherein the diet formulation comprises about 50 ppm of L-carnitine.

14. A method for supplementing sow diets with L-carnitine comprising: feeding a sow from approximately 9 to approximately 14,000 mg of L-carnitine or a salt thereof per day at least throughout the gestation period.

15. The method of claim 14, wherein said sow is fed L-carnitine in the amount of from approximately 9 to approximately 550 mg per day.

16. The method of claim 14, wherein said sow is also fed L-carnitine throughout all or part of the lactation period in the amount from approximately 20 to approximately 34,000 mg per day.

17. A method for supplementing sow diets with L-carnitine comprising: feeding a sow from approximately 9 to approximately 14,000 mg of L-carnitine or a salt thereof per day for at least five days in the first ninety days of gestation.

18. The method of claim 17, wherein said sow is fed L-carnitine in the amount of from approximately 9 to approximately 550 mg per day.

19. The method of claim 17, wherein said sow is fed L-carnitine for at least ten days in the first ninety days of gestation.

20. The method of claim 17, wherein said sow is fed L-carnitine for at least five days in the first sixty days of gestation.

21. The method of claim 17, wherein said sow is fed L-carnitine for at least ten days in the first sixty days of gestation.

22. The method of claim 17, wherein said sow is also fed L-carnitine throughout all or part of the lactation period in the amount from approximately 20 to approximately 34,000 mg per day.

* * * * *